United States Patent
Dalmia et al.

(10) Patent No.: US 9,440,378 B2
(45) Date of Patent: Sep. 13, 2016

(54) PLANAR ELECTRONIC DEVICE AND METHOD FOR MANUFACTURING

(75) Inventors: Sidharth Dalmia, Fair Oaks, CA (US); William Lee Harrison, El Dorado Hills, CA (US)

(73) Assignee: Tyco Electronics Corporation, Berwyn, PA (US)

(*) Notice: Subject to any disclaimer, the term of this patent is extended or adjusted under 35 U.S.C. 154(b) by 1076 days.

(21) Appl. No.: 13/407,161

(22) Filed: Feb. 28, 2012

(65) Prior Publication Data
US 2012/0154097 A1 Jun. 21, 2012

Related U.S. Application Data

(63) Continuation-in-part of application No. 13/028,949, filed on Feb. 16, 2011, now Pat. No. 9,070,509.

(60) Provisional application No. 61/343,967, filed on May 5, 2010.

(51) Int. Cl.
| H01F 5/00 | (2006.01) |
| H01F 27/28 | (2006.01) |
| B29C 39/10 | (2006.01) |
| H01F 17/00 | (2006.01) |
| H01F 41/04 | (2006.01) |
| H01F 17/04 | (2006.01) |

(52) U.S. Cl.
CPC ........... *B29C 39/10* (2013.01); *H01F 17/0033* (2013.01); *H01F 41/046* (2013.01); *H01F 2017/048* (2013.01); *Y10T 29/49124* (2015.01)

(58) Field of Classification Search
CPC .................................. H01F 5/00; H01F 27/28
USPC .......................................... 336/200, 229, 232
See application file for complete search history.

(56) References Cited

U.S. PATENT DOCUMENTS

| 3,881,244 A | 5/1975 | Kendall |
| 5,055,816 A | 10/1991 | Altman et al. |
| 5,191,699 A * | 3/1993 | Ganslmeier ......... H01F 17/0033 264/272.19 |
| 6,148,500 A | 11/2000 | Krone et al. |

(Continued)

FOREIGN PATENT DOCUMENTS

| CN | 101018446 | 8/2007 |
| CN | 201663036 | 12/2010 |

(Continued)

OTHER PUBLICATIONS

Shocking Technologies website, <http://www.shockingtechnologies.com> Mar. 3, 2011

*Primary Examiner* — Tsz Chan

(57) ABSTRACT

A method of manufacturing a planar board substrate for receiving a magnetic core. The method includes providing a cover layer having a layer side and providing a base layer having first and second sides. The base layer includes a material hole that extends completely through the base layer between the first and second sides. The method also includes coupling the cover and base layers to each other along the first side and the layer side. The cover layer extends over at least a portion of the material hole. The method also includes providing a dielectric member within the material hole, wherein a core-holding channel exists between the dielectric member and the base layer. The core-holding channel extends circumferentially around the dielectric member and is configured to have a magnetic core therein.

13 Claims, 10 Drawing Sheets

(56) References Cited

U.S. PATENT DOCUMENTS

| | | | |
|---|---|---|---|
| 6,181,130 B1* | 1/2001 | Hoshi | G01R 33/045 324/249 |
| 7,158,005 B2 | 1/2007 | Pleskach et al. | |
| 7,271,697 B2 | 9/2007 | Whittaker et al. | |
| 7,671,716 B2 | 3/2010 | Chen | |
| 7,821,374 B2 | 10/2010 | Harrison et al. | |
| 2004/0212475 A1 | 10/2004 | Schumacher | |
| 2009/0002111 A1 | 1/2009 | Harrison et al. | |
| 2010/0295646 A1* | 11/2010 | Harrison | H01F 19/04 336/192 |
| 2011/0108317 A1 | 5/2011 | Harrison et al. | |
| 2011/0272094 A1 | 11/2011 | Dalmia et al. | |

FOREIGN PATENT DOCUMENTS

| | | |
|---|---|---|
| JP | 2006165212 A * | 6/2006 |
| WO | WO 2006/063081 | 6/2006 |
| WO | WO 2008/088682 | 7/2008 |

* cited by examiner

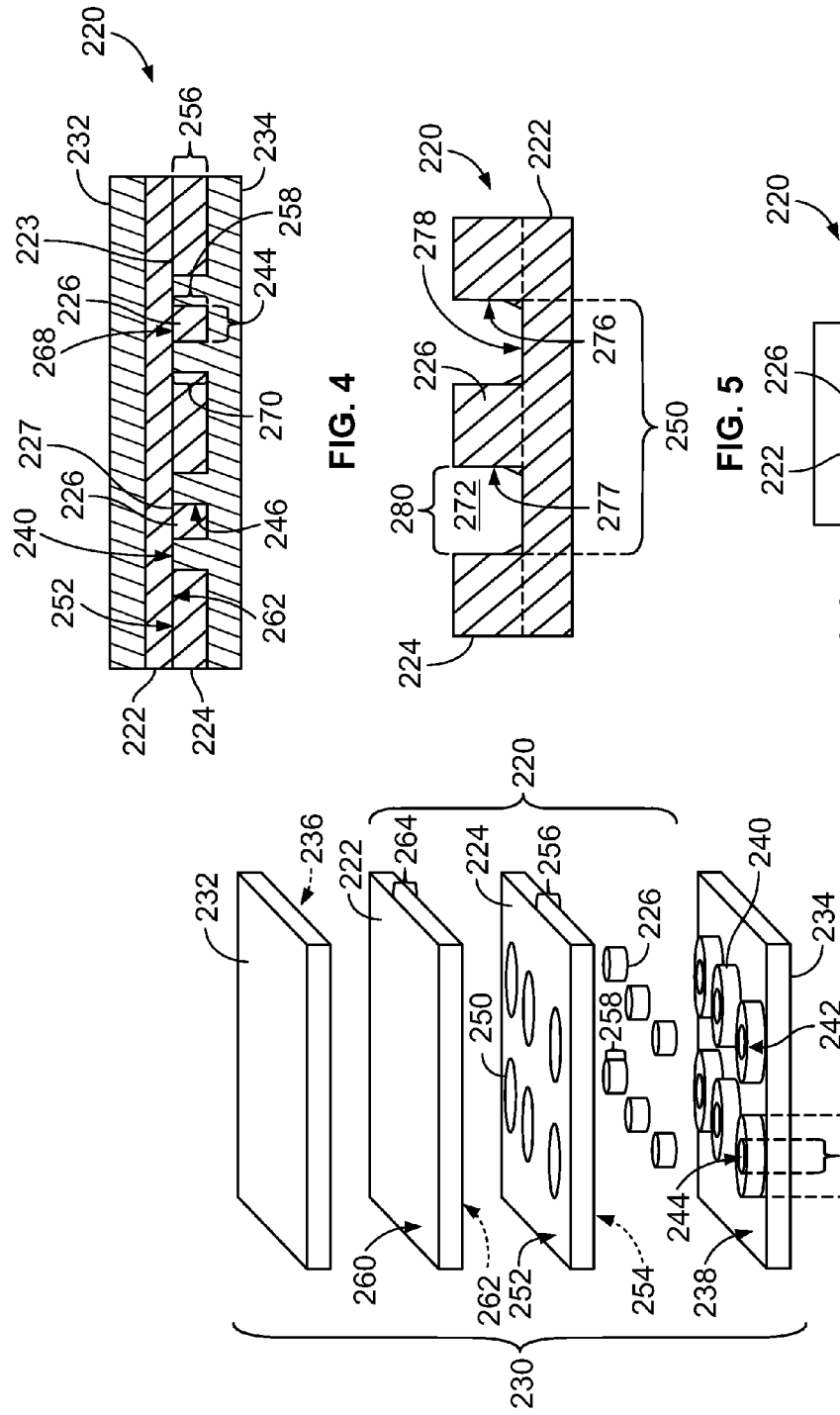
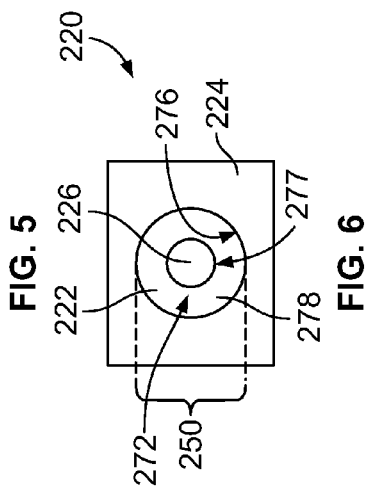
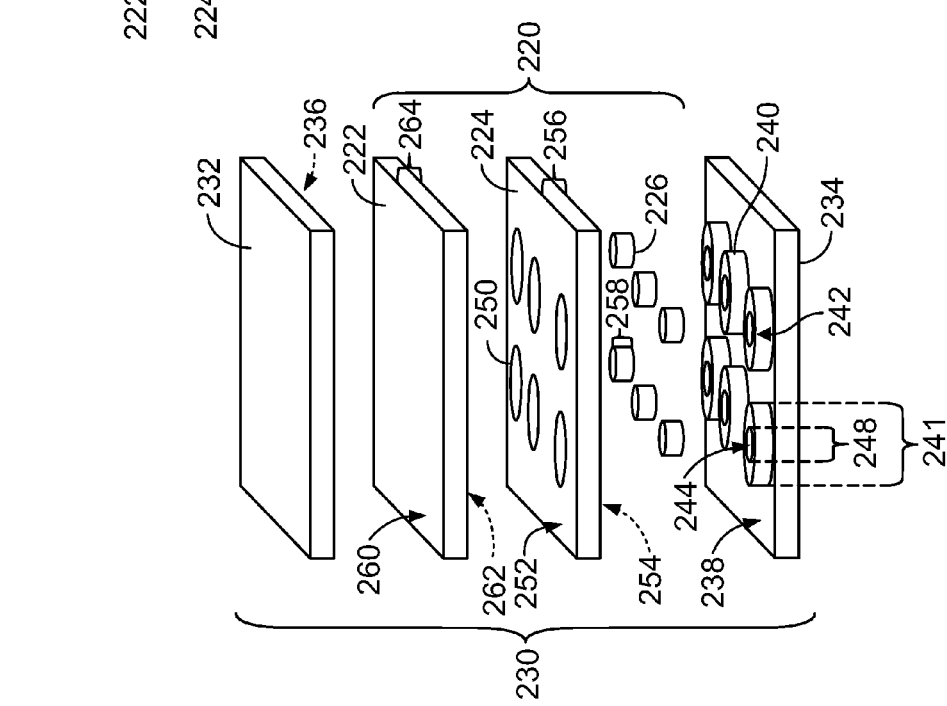

PLANAR ELECTRONIC DEVICE AND METHOD FOR MANUFACTURING

CROSS-REFERENCE TO RELATED APPLICATIONS

This application is a continuation-in-part of U.S. application Ser. No. 13/028,949 (the '949 application), which is entitled "Planar Electronic Device Having a Magnetic Component and Method of Manufacturing the Electronic Device" and was filed on Feb. 16, 2011. The '949 application claims benefit to U.S. Provisional Application No. 61/343,967 (the '967 Application), which is entitled "Manufacturing Of Embedded Components Using Integrated Ferrites In Laminate Materials" and was filed on May 5, 2010. Each of the '949 and '967 Applications is incorporated by reference herein in its entirety.

BACKGROUND OF THE INVENTION

The subject matter herein relates generally to electronic devices, such as transformers, inductors, baluns, couplers, or filters.

Some known electronic devices include planar bodies, such as circuit boards, that include one or more magnetic components built into the planar bodies. The magnetic component can include a ferrite core with conductive winding extending around the ferrite core. Some of these magnetic components include two conductive windings that are not conductively coupled with each other. For example, the conductive windings may not be physically or mechanically coupled such that electric current cannot flow through one conductive winding directly to the other conductive winding. The current flowing through one winding generates a magnetic field in the core and in the other winding. The magnetic field in the other winding generates an electric current. The electrical performance of the device is determined by a variety of parameters, such as the ratio of the number of turns in the first winding to the number of turns in the second winding, the shape of the first and/or second windings, the impedance of the first and second windings, and the like.

The manufacturing process of some known planar electronic devices includes drilling or routing a planar board substrate. More specifically, the planar board substrate may include a plurality of substrate layers (e.g., FR-4 and other PCB-type materials). Portions of the substrate layers may be removed through controlled depth routing. In controlled depth routing, a drill bit is moved along a predetermined path to remove substrate material and provide a recess or cavity within the planar board substrate. The recess does not extend entirely through the planar board substrate. After forming the recess, a magnetic core (e.g., ferrite core) may be loaded into the recess. Although controlled depth routing is capable of providing sufficient recesses during the manufacture of planar electronic devices, in some cases the controlled depth routing can add significant costs to the planar electronic devices.

Accordingly, there is a need for a less expensive method of manufacturing a planar board substrate.

BRIEF DESCRIPTION OF THE INVENTION

In one embodiment, a method of manufacturing a planar board substrate for receiving a magnetic core is provided. The method includes providing a cover layer having a layer side and providing a base layer having first and second sides. The base layer includes a material hole that extends completely through the base layer between the first and second sides. The method also includes coupling the cover and base layers to each other along the first side and the layer side. The cover layer extends over at least a portion of the material hole. The method also includes providing a dielectric member within the material hole, wherein a core-holding channel exists between the dielectric member and the base layer. The core-holding channel extends circumferentially around the dielectric member and is configured to have a magnetic core therein.

In another embodiment, a planar electronic device is provided that includes a cover layer of substrate material and a base layer of substrate material coupled to and extending alongside the cover layer. The base layer includes a material hole that extends completely through the base layer. The cover layer extends over at least a portion of the material hole. The electronic device also includes a magnetic core positioned in the material hole and a dielectric member within the material hole. A core-holding channel exists between the dielectric member and the base layer. The core-holding channel extending circumferentially around the dielectric member and holding the magnetic core.

BRIEF DESCRIPTION OF THE DRAWINGS

FIG. 3 is an exploded view of a board manufacturing assembly and a planar board substrate in accordance with one embodiment.

FIG. 4 is a cross-section of the manufacturing assembly and the board substrate of FIG. 3 during a lamination process.

FIG. 5 is an enlarged cross-section of the board substrate of FIG. 3 showing a core-holding channel.

FIG. 6 is an enlarged plan view of the board substrate of FIG. 3 showing the core-holding channel.

DETAILED DESCRIPTION OF THE INVENTION

Figure 1:
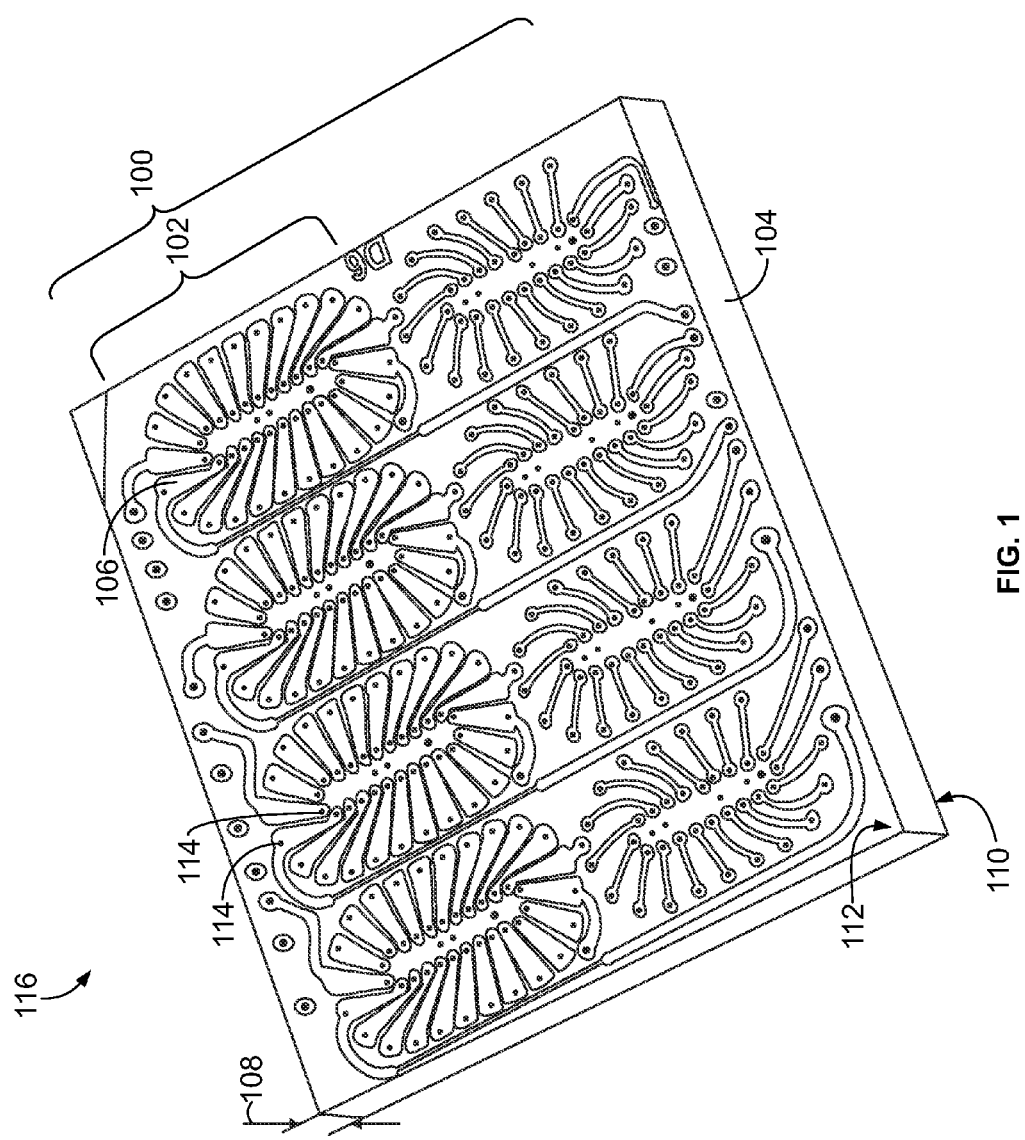
FIG. 1 is a perspective view of one embodiment of a planar electronic device having an array of magnetic components.

The foregoing summary, as well as the following detailed description of certain embodiments will be better understood when read in conjunction with the appended drawings. As used herein, an element, step, or operation recited in the singular and proceeded with the word "a" or "an" should be understood as not excluding plural of said elements, steps, or operations unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

One or more embodiments described herein provide planar electronic devices that include planar board substrates that hold magnetic components, such as planar transformers. The magnetic components may include magnetic cores (e.g., ferrite material bodies) that are embedded into the corresponding board substrate. The magnetic components may also include conductive windings or loops that are wrapped about the magnetic cores. The board substrate may have a composition that is similar to a printed circuit board (PCB) and include a plurality of substrate layers. The substrate layers may include a base layer (or first layer) and a cover layer (or second layer). The base layer can have one or more material holes extending therethrough that are sized and shaped to receive respective magnetic cores. The cover layer may extend along one side of the base layer and completely cover the material holes or only partially cover the material holes. In particular embodiments, the material holes extend completely through the base layer.

The planar board substrate is configured to hold the magnetic cores in a predetermined manner (e.g., predetermined orientation and/or location with respect to the base layer). The base and/or cover layers can include alignment features that facilitate locating the magnetic cores within the board substrate. For example, in some embodiments, the base layer may include alignment features that at least partially define the material holes and engage the magnetic core when the magnetic core is loaded into the material hole. In some embodiments, the cover layer may also be configured to hold the magnetic cores. In such embodiments, the cover layer may be characterized as a centering layer. For example, the cover layer can include cover holes that are dimensioned to be smaller than the magnetic cores. When a magnetic core is loaded into the material hole that is aligned with a cover hole, the magnetic core may engage an edge that defines the cover hole. The edge may hold the magnetic core in a predetermined manner.

In the planar electronic device, the magnetic cores can be encapsulated in a low-stress adhesive, such as a low-stress epoxy, that is disposed to provide a proper electrical environment. In a cured state, the epoxy can be near solid, flexible, and/or elastic in nature. The elasticity and/or flexibility of the cured epoxy can vary depending on the curing agents used and/or the composition of the epoxy. One or more layers of a conductive material (e.g., copper) disposed on or in the planar board substrate and conductive vias extending through the board substrate may provide a magnetic component, such as a transformer.

FIG. 1 is a perspective view of one embodiment of a planar electronic device 116 having an array 100 of magnetic components 102. The magnetic components 102 shown in FIG. 1 are transformer devices. Alternatively, the magnetic components 102 may be or include another electronic device or component, such as an inductor, filter, balun, coupler, and the like. The magnetic components 102 may include a magnetic core, such as a ferrite body or other magnetic material. The magnetic components 102 are disposed in a planar dielectric or non-conductive board substrate 104. The illustrated magnetic components 102 are generally oval-shaped, but may have different shapes, such as a circular shape.

The board substrate 104 has a thickness dimension 108 that is measured between a first or lower side 110 and an opposite second or upper side 112 of the board substrate 104. As used herein, the terms "lower" and "upper" are used to refer to the opposite sides of the board substrate 104. The use of the terms "lower" and "upper" are not meant to limit or require a single, specific orientation of the board substrate 104. For example, the board substrate 104 may be flipped over such that the upper side 112 is below the lower side 110.

For each magnetic component 102, several top conductors 106 are disposed on the upper side 112 of the board substrate 104 and several bottom conductors (not shown) are disposed on the lower side 110 of the board substrate 104. The bottom conductors may be the same size and/or shape as the top conductors 106. The board substrate 104 includes vias 114 that extend through the board substrate 104 between the lower and upper sides 110, 112 of the board substrate 104. The vias 114 are filled or plated with a conductive material to provide conductive pathways through the board substrate 104. Opposite ends of each via 114 are conductively coupled with the conductors 106 and the bottom conductors on the board substrate 104. The vias 114, top conductors 106, and bottom conductors form looping or winding conductive pathways that wrap multiple times around a magnetic core 200 (shown in FIG. 2) disposed within the board substrate 104.

Figure 2:
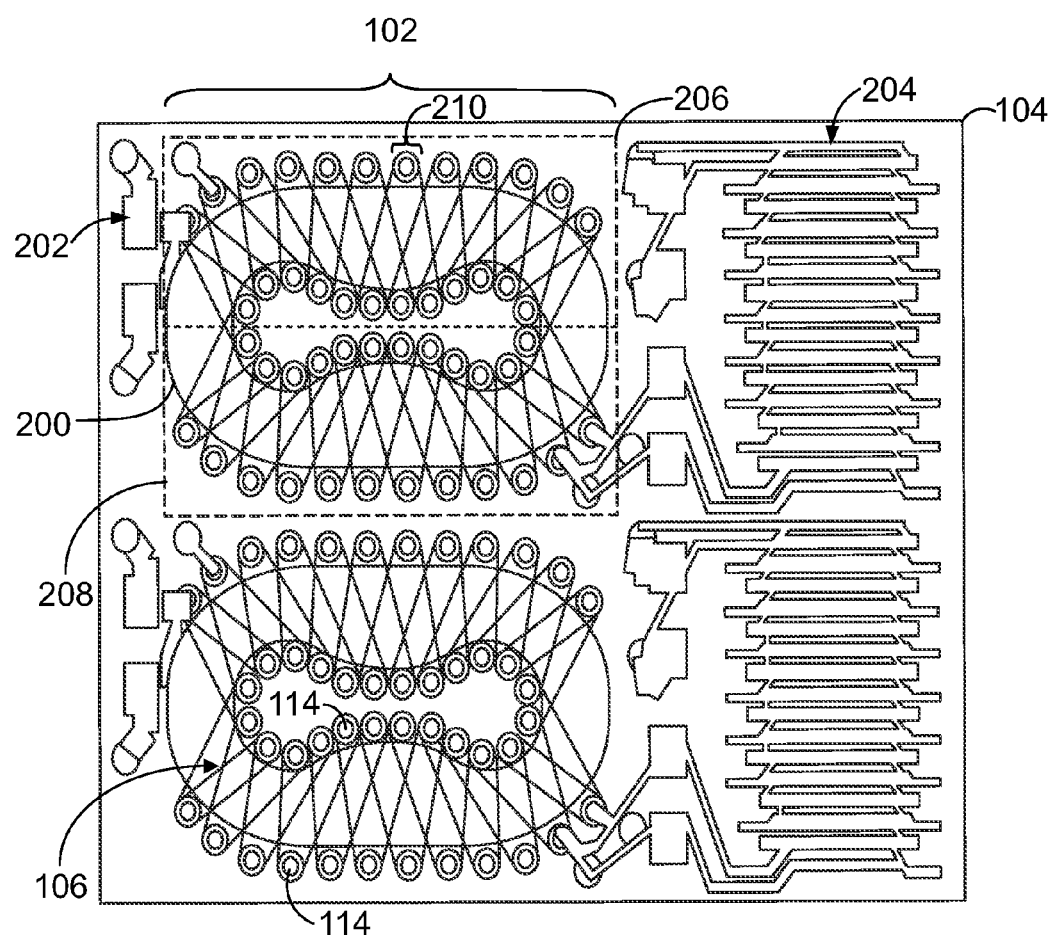
FIG. 2 is a top view of magnetic components of the electronic device shown in FIG. 1.

FIG. 2 is a top view of two magnetic components 102 shown in FIG. 1. For each magnetic component 102, the top conductors 106 are conductively coupled with the vias 114 at opposite ends of the top conductors 106. As described above, the vias 114 include conductive material and are conductively coupled with the bottom conductors (not shown) disposed on the lower side 110 (FIG. 1) of the board substrate 104.

The conductive pathways formed by the top conductors 106, vias 114, and bottom conductors may be referred to as first and second conductive loops 206, 208 that extend around the magnetic core 200. Each of the reference numbers 206, 208 in FIG. 2 point to dashed boxes that encircle a different conductive loop of the same magnetic component 102. Each conductive loop 206, 208 includes several turns 210 around the magnetic core 200. The combination of the conductive loops 206, 208 and the magnetic core 200 form the magnetic component 102. The conductive loops 206, 208 that wrap around the same magnetic core 200 may not be conductively coupled with each other. In one embodiment, the first conductive loop 206 of the magnetic component 102 may receive electric power from a first circuit 202. The second conductive loop 208 of the same magnetic component 102 may be conductively coupled with a second circuit 204.

The first and second conductive loops 206, 208 can be inductively coupled with each other by the magnetic core 200 such that electric current passing through the first conductive loop 206 is inductively transferred to the second conductive loop 208. For example, a varying electric current passing through the first conductive loop 206 can create a varying magnetic flux in the magnetic core 200. The varying magnetic flux generates a varying magnetic field in the second conductive loop 208. The varying magnetic field induces a varying electromotive force, or voltage, in the second conductive loop 208. The second conductive loop 208 transfers the induced voltage to the second circuit 204.

FIGS. 3-16 illustrate various planar board substrates that may be used with a planar electronic device, such as the electronic device 116 shown in FIG. 1. The planar board substrates may be configured to hold magnetic components, such as a transformer. FIGS. 3-16 also show the various manners in which board substrates may be manufactured. As used herein, the term "planar board substrate" includes board substrates that are subsequently modified. For example, each of the planar board substrates shown in FIGS. 3-16 may be modified by having substrate material removed (e.g., through drilling, punching or etching) or added (e.g., by adding other substrate layers, encapsulant, or other dielectric material) and by having conductive material added or etched. In other words, the planar board substrates described herein may require additional modifications before being suitable for use in a planar electronic device.

FIG. 3 is an exploded view of various elements of a planar board substrate 220 and elements that may be used to manufacture the board substrate 220. As shown, the board substrate 220 may include a cover layer 222, a base layer 224, and dielectric members 226. Also shown, a board manufacturing assembly 230 may include first and second mold or press structures 232, 234. The manufacturing assembly 230 may be used by or as a lamination press to combine multiple substrate layers, such as the cover and base layers 222, 224. In the illustrated embodiment, the first and second mold structures 232, 234 comprise rigid materials. For example, the first and second mold structures may be steel or aluminum plates or caul plates. The plates may have smooth surfaces that are free from defects and have the same size and shape as a composite lay-up. The plates may be used in contact with the lay-up during the curing process to transmit normal pressure and provide a smooth surface on the finished laminate. The first and second mold structures 232, 234 are configured to withstand the pressure and heat that accompanies lamination processes of circuit boards.

The first and second mold structures 232, 234 include engagement surfaces 236, 238, respectively, that are configured to interface with and press the board substrate 220. The engagement surfaces 236, 238 face each other and are configured to have the cover layer 222, the base layer 224, and dielectric members 226 located therebetween. In the illustrated embodiment, the engagement surface 236 is planar. However, the engagement surface 236 may be shaped as desired for manufacturing the board substrate 220.

The second mold structure 234 includes a plurality of platforms 240 coupled to and projecting away from the engagement surface 238. In some embodiments, the second mold structure 234 is a single continuous structure such that the engagement surface 238 and the platforms 240 are formed from the same material (e.g., steel, aluminum, and the like). The platforms 240 are substantially upright with respect to the engagement surface 238. For instance, each of the platforms 240 may have an outer or peripheral surface 242 that extends perpendicular to the engagement surface 238 and that faces radially away from the corresponding platform 240. However, in other embodiments, the peripheral surface 242 may extend at an incline with respect to the engagement surface 238. The engagement surface 238 may be substantially planar throughout except for where the platforms 240 project therefrom.

Each platform 240 has an outer perimeter 241 that is defined by the peripheral surface 242. The outer perimeter 241 may include a curved contour when looking directly down upon the engagement surface 238. For example, in the illustrated embodiment, the peripheral surface 242 is shaped such that the outer perimeter 241 forms a complete circle. However, the outer perimeters 241 of the platforms 240 may have other shapes that include curved contours. For instance, the outer perimeter 241 may be substantially circular, semi-circular, oval-shaped, and the like. Moreover, curved contours may include portions of the outer perimeter 241 that are curved and other portions that are linear. Also, although the platforms 240 have a common shape in the illustrated embodiment, other embodiments may include platforms that have different shapes. For example, one platform 240 may be circular while another platform 240 may be oval-shaped or square.

Also shown in FIG. 3, each of the platforms 240 may include a member cavity 244. The member cavity 244 is completed surrounded by the corresponding platform 240 and opens in a direction away from the engagement surface 238. In the illustrated embodiment, the member cavities 244 are sized and shaped to receive corresponding dielectric members 226. Each of the member cavities 244 is defined by a corresponding interior or inner surface 246 (shown in FIG. 4) of the corresponding platform 240. The inner surface 246 may define an inner perimeter 248. The inner perimeter 248 may have a similar shape as the outer perimeter 241 (e.g., the inner and outer perimeters 248, 241 may be differently sized circles or differently sized squares). In other embodiments, the inner and outer perimeters 248, 241 may be differently shaped.

The cover layer 222 comprises a substrate material that may be used in manufacturing circuit boards. It is understood that substrate layers, such as the cover layer 222 and the base layer 224, may include a plurality of stacked substrate layers (e.g., sub-layers). The substrate material may include or be formed from a dielectric material, such as a glass-filled epoxy (e.g., FR-4) suitable for a printed circuit board (PCB), a thermoset material, or a thermoplastic material. The substrate materials can be alternating layers of fully cured substrates and uncured B Stage material unless the materials are thermoplastic or fluid stage thermoset. A thickness dimension 256 of the base layer 224 can be made up of one thick layer or several sheets of prepreg or alternating layers with similar patterns. Other rigid or semi-rigid material may be used. The cover layer 222 includes opposite first and second layer sides 260, 262 and a thickness dimension 264 extending therebetween. In the illustrated embodiment, the cover layer 222 may be formed prior to being stacked onto the base layer 224. However, in other embodiments, the cover layer 222 may be formed over the base layer 224. For example, a viscous polymer material may be spread along the base layer 224 and subsequently cured to form the cover layer 222. In the illustrated embodiment, the cover layer 222 is a continuous body that does not include any holes.

The base layer 224 also comprises a substrate material that can be similar to the materials described above with respect to the cover layer 222. The base layer 224 has first and second sides 252, 254 and a thickness dimension 256 extending therebetween. The first and second sides 252, 254 may also be referred to as layer sides or base sides. As shown, the base layer 224 includes a plurality of material holes 250. The material holes 250 may constitute passages that extend completely through the base layer 224 between the first and second sides 252, 254. In the embodiment shown in FIG. 3, the material holes 250 are sized and shaped to receive corresponding platforms 240.

The material holes 250 may be formed by removing the substrate material of the base layer 224. For example, the material holes 250 may be formed by punching the base layer 224 during, e.g., a precision punching process. When the base layer 224 is punched to form the material holes 250, the base layer 224 may be positioned between a punch (not shown) and a corresponding die (not shown). The punch has an end that may be shaped similar to the desired hole size and shape of the material hole 250. The die typically includes a recess or cavity that is sized and shaped to receive the punched material and the end of the punch. With the base layer 224 positioned between the punch and die, the punch is driven through the base layer 224 and into the die. The punch shears the substrate material of the base layer 224 thereby forming the material holes 250.

In such embodiments where the base layer 224 was punched, an inwardly-facing surface 276 (shown in FIG. 5) that defines the material hole 250 may be a sheared surface. More specifically, the inwardly-facing surface 276 may exhibit qualities, properties, and/or characteristics that are associated with surfaces that were sheared. The base layer 224 may undergo several separate punchings from the same punch to form the plurality of material holes 250. In other embodiments, a plurality of punches may be used to simultaneously form the material holes 250. For example, a multi-head machine may drive the plurality of punches into a corresponding plurality of dies to simultaneously generate a plurality of the material holes 250.

However, the material holes 250 may be formed in other manners. For example, the material holes 250 may be formed through drilling or routing. The drilling can be performed with a hollow drill bit, Forstner drill bit, or a standard PCB drill bit. When routing, it is recommended to use a standard drill bit although others may be used. In such embodiments, the inwardly-facing surface 276 that defines the material hole 250 is a drilled surface. In other embodiments, the material holes 250 may be formed by etching the base layer 224 such that the material holes 250 are defined by etched surfaces. The etching may be accomplished by Reactive Ion etching (RIE) or plasma etching. In either case, the inwardly-facing surface 276 may exhibit qualities, properties, and/or characteristics that are associated with how the material hole 250 was made. The manufacturing method to form the material holes 250 (e.g., punching, drilling, etching, and the like) may be identified upon inspection of the board substrate or subsequently formed electronic device. Inspection of the board substrate or the electronic device may be through use of a scanning electron microscope (SEM) or other microscope.

The dielectric members 226 are sized and shaped to fit within corresponding member cavities 244 of the mold structure 234. For example, the dielectric members 226 can have a shape that is similar to a shape defined by the inner perimeter 248. However, the size of the dielectric members 226 may be less than the size of the corresponding member cavities 244. A thickness dimension 258 of the dielectric member 226 may be substantially equal to the thickness dimension 256 of the base layer 224. In some embodiments, the dielectric members 226 are formed from the substrate material that was removed from the base layer 224. For example, substrate material that is punched from the base layer 224 to form one of the material holes 250 may also be used as one of the dielectric member 226.

In some embodiments, using materials that are in a fluidic stage, such as thermoset resin or thermoplastic resin, may also be desirable instead of using procured C-Stage material like FR-4. The fluidic resin can be glass free and flow into the gaps defined in the mold structure 234 to desired dimensions.

FIG. 4 is a cross-sectional view of the various elements of a portion of the board substrate 220 during a lamination process. As shown, the cover layer 222 is stacked with respect to the base layer 224. More specifically, the first side 252 of the base layer 224 interfaces with the layer side 262 of the cover layer 222. The dielectric members 226 are located within the corresponding member cavities 244 and have respective member faces 268 that interface with the layer side 262 of the cover layer 222. In the illustrated embodiment, the thickness dimensions 256, 258 are substantially equal to a height 270 of the platform 240. In other embodiments, the thickness dimension 258 and the thickness dimension 256 may be greater than or less than the height 270 provided that the base layer 224 and the dielectric members 226 are still capable of coupling to the cover layer 222.

The cover and base layers 222, 224 may be aligned in a predetermined manner when stacked with respect to each other. One or both of the first and second mold structures 232, 234 may include board alignment features (not shown) that engage the cover and base layers 222, 224. For example, the second mold structure 234 may include a plurality of posts (not shown) that are received by corresponding passages (not shown) of the base layer 224 and the cover layer 222. The passages may be located along the periphery of the cover and base layers 222, 224 and/or toward middles of the cover and base layers 222, 224.

The cover and base layers 222, 224 may be coupled to each other during a laminating process. For example, B-stage or prepreg sheets (not shown) may be located along an interface 223 between the cover and base layers 222, 224 and an interface 227 between the cover layer 222 and the dielectric members 226. The sheets can already be part of the cover and/or base layers 222, 224 when the cover layer 222 and the base layer 224 are stacked with respect to each other. The sheets are subjected to heat and pressure to cure the sheets and couple (e.g., bond) the base layer 224 and the dielectric members 226 to the cover layer 222. A vacuum can be used if desired. Thus, the base layer 224 and the dielectric members 226 may be simultaneously (e.g., during the same laminating process) coupled to the cover layer 222 even though the base layer 224 and the dielectric members 226 are distinct or independent components. However, the above is only one example of a method for laminating the cover and base layers 222, 224 and dielectric members 226 to one another. Similar or different processes may be used to couple the elements together.

FIGS. 5 and 6 are enlarged views of the board substrate 220 showing one material hole 250 in greater detail after the base layer 224 and the dielectric members 226 are coupled to the cover layer 222. FIG. 5 is a cross-section and FIG. 6 is a top plan view of the portion of the board substrate 220. It should be noted that FIGS. 5 and 6 are inverted with respect to FIGS. 3 and 4. As shown, a core-holding channel 272 is formed when the dielectric member 226 is provided to the material hole 250. The core-holding channel 272 exists between the dielectric member 226 and the base layer 224. The core-holding channel 272 is defined by interior surfaces 276-278 that include an inwardly-facing surface 276 of the base layer 224, an outwardly-facing surface 277 of the dielectric member 226, and a bottom surface 278 defined by the cover layer 222. A width dimension 280 (FIG. 5) of the core-holding channel 272 extends between the inwardly-facing surface 276 and the outwardly-facing surface 277. In some embodiments, the width dimension 280 is substantially uniform throughout the core-holding channel 272. However, in other embodiments, the width dimension 280 of the core-holding channel 272 may vary.

The core-holding channel 272 is configured to have a magnetic core 288 (shown in FIG. 7) located therein, which may be similar to the magnetic core 200 (FIG. 2). The core-holding channel 272 extends circumferentially around the dielectric member 226. In the illustrated embodiment, the core-holding channel 272 extends entirely around the dielectric member 226 in a substantially circular path such that the core-holding channel 272 is donut-shaped. However, embodiments are not limited to the embodiment shown in FIGS. 5 and 6. As used herein, the term "circumferentially around" includes the core-holding channel 272 extending only a substantial portion around the dielectric member 226. For example, the core-holding channel 272 may form a C-shaped arc that extends at least about halfway around the dielectric member 226. Moreover, the term "circumferentially around" does not require a circular path or a curved path, but may include other shapes. For example, the core-holding channel 272 may extend around the dielectric member 226 along a path that is square-shaped, rectangular-shaped, or polygonal-shaped.

In some cases, after the cover and base layers 222, 224 are coupled to each other, the core-holding channel 272 may not be suitable for receiving the magnetic core 288. For example, the core-holding channel 272 may be improperly dimensioned or may have undesirable material within the core-holding channel 272, such as resin that flowed into the core-holding channel 272 during lamination or an uneven surface caused by the removal process (e.g., punching). In such cases, the core-holding channel 272 may be etched or drilled (or routed) to suitably shape the core-holding channel 272 or remove any unwanted material. For example, at least one of the inwardly-facing surface 276, the outwardly facing surface 277, or the bottom surface 278 may have substrate material removed therefrom. In some embodiments, the width dimension 280 may be increased due to a material removal process, such as drilling, etching, and the like.

Figure 7:
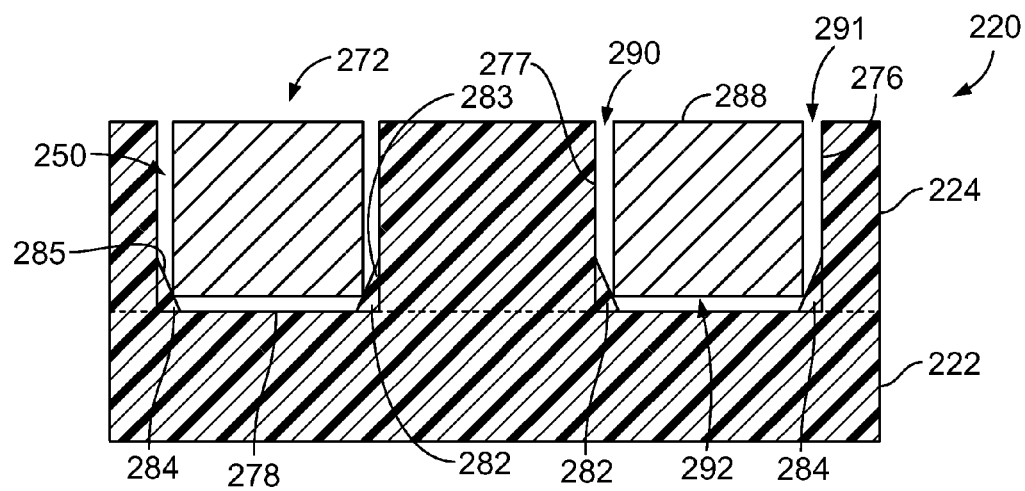
FIG. 7 is an enlarged cross-section of the board substrate showing the core-holding channel having a magnetic core therein.

FIG. 7 is an enlarged cross-section of the board substrate 220 showing the magnetic core 288 located in the core-holding channel 272. The core-holding channel 272 may include inner and outer alignment features 282, 284 that at least partially define the material hole 250 or the core-holding channel 272. The alignment features 282, 284 may be formed by the material removal process described above (e.g., by the etching or drilling of the interior surfaces 276-278) or during a separate material removal process. In some cases, only a portion(s) of the interior surfaces 276-278 may be etched or drilled such that portions of the inwardly-facing surface 276 and the outwardly facing surface 277 may retain the surface qualities from the process that formed the material holes 250. For example, at least a portion of the inwardly-facing surface 276 may be a sheared surface formed from punching the base layer 224 to form the material hole 250 while another portion of the inwardly-facing surface 276 may be a drilled surface.

The alignment features 282, 284 may be shaped to have a centering effect on the magnetic core 288 when the magnetic core 288 is positioned into the core-holding channel 272. The alignment features 282, 284 may extend toward the magnetic core 288. In the illustrated embodiment, the alignment feature 282 includes a sloped surface 283 that extends between the outwardly-facing surface 277 and the bottom surface 278. The alignment feature 284 includes a sloped surface 285 that extends between the inwardly-facing surface 276 and the bottom surface 278. However, the alignment features 282, 284 may have other configurations in other embodiments.

The alignment features 282, 284 may reduce the tolerances in the manufacturing process that are related to the positioning of the magnetic core 288. The alignment features 282, 284 may also cause respective gaps 290, 291 that exist between the magnetic core 288 and the inwardly-facing surface 276 and the outwardly-facing surface 277. A gap 292 may also exist between the magnetic core 288 and the bottom surface 278. In subsequent processes, the gaps 290-292 may facilitate the flow of an encapsulating material and permit expansion and/or compression of the magnetic core 288 during the heating and pressurizing associated with lamination.

Figure 8:
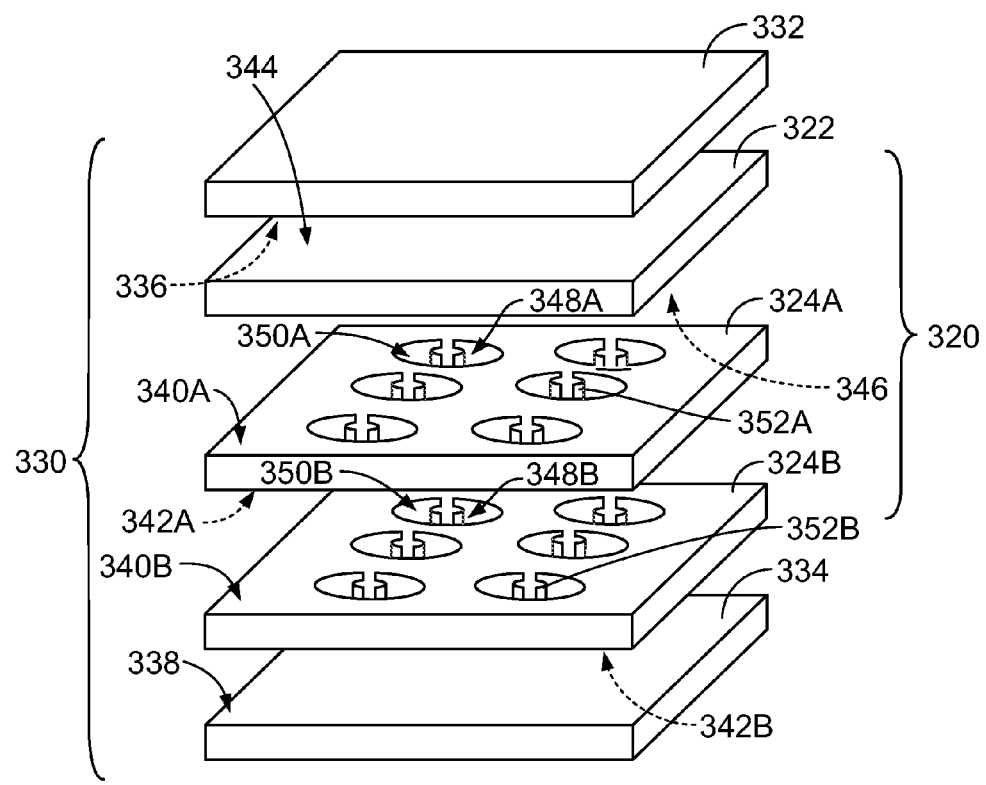
FIG. 8 is an exploded view of a board manufacturing assembly and a planar board substrate in accordance with one embodiment.

FIG. 8 is an exploded view of various elements of a planar board substrate 320 and a board manufacturing assembly 330 that may be used to manufacture the board substrate 320. As shown, the board substrate 320 may include a cover layer 322 and one or more base layers 324A, 324B. The cover layer 322 and the base layers 324A, 324B may include similar substrate materials and/or may be manufactured in similar manners as described above with respect to the cover layer 222 (FIG. 3) and the base layer 224 (FIG. 3). The base layer 324A has opposite layer sides 340A, 342A, and the base layer 324B has opposite layer sides 340B, 342B. The cover layer 322 has opposite layer sides 344, 346.

Each of the base layers 324A, 324B include material holes 348, 350. The material holes 348, 350 extend completely through the corresponding base layer 324A or 324B. In the illustrated embodiment, the base layers 324A, 324B include a plurality of pairs of material holes 348A, 350A and 348B, 350B, respectively. In the illustrated embodiment, the material holes 348A, 350A and the material holes 348B, 350B are semi-circular and face the other material hole of the pair. However, in other embodiments, a single material hole may be used that extends almost entirely around. For example, the single material hole may be C-shaped or have a path that is almost a complete circle. The material holes 348A, 350A and 348B, 350B may be manufactured in a similar manner as described above with respect to the material holes 250 (FIG. 3). For example, the material holes 348A, 350A and 348B, 350B may be punched, drilled, and/or etched. The material holes 348A, 350A along the base layer 324A can be patterned in the same manner as the material holes 348B, 350B along the base layer 324B. As such, when the base layers 324A, 324B are stacked with respect to each other, the material holes 348A of the base layer 324A are aligned with the material holes 348B of the base layer 324B and the material holes 350A of the base layer 324A are aligned with the material holes 350B of the base layer 324B.

The substrate material of the base layers 324A, 324B may include or be formed from a dielectric material, such as a glass-filled epoxy (e.g., FR-4) suitable for a printed circuit board (PCB), a thermoset material, or a thermoplastic material. The substrate materials can be alternating layers of fully cured substrates and uncured B Stage material unless the materials are thermoplastic or fluid stage thermoset. A thickness dimension of the base layers can be made up of one thick layer or several sheets of prepreg or alternating layers with similar patterns. Other rigid or semi-rigid materials may be used.

When the pair of material holes 348A, 350A is formed a corresponding base extension 352A may also be formed. When the pair of material holes 348B, 350B is formed a corresponding base extension 352B may also be formed. In the illustrated embodiment, each of the base extensions 352A, 352B extends between the corresponding pair of the material holes 348A, 350A and 348B, 350B, respectively. The material holes 348A, 350A are separated from each other by the base extension 352A, and the material holes 348B, 350B are separated from each other by the base extension 352B. However, a base extension can also be formed when making only one material hole. As described above, if the material hole is, for example, C-shaped or if the material hole almost makes a complete circle, a base extension can be defined by the single material hole.

Also shown, the board manufacturing assembly 330 may include first and second mold or press structures 332, 334. Similar to the manufacturing assembly 230 (FIG. 3), the first and second mold structures 332, 334 comprise rigid materials and are configured to withstand the pressure and heat that accompanies lamination processes of circuit boards. The first and second mold structures 332, 334 include engagement surfaces 336, 338, respectively, that are configured to interface with and press the elements of the board substrate 320 together. The engagement surfaces 336, 338 face each other with the cover layer 322 and the base layers 324A, 324B located therebetween. In the illustrated embodiment, the engagement surfaces 336, 338 are substantially planar.

The cover and base layers 322, 324A, 324B may be coupled to each other in a similar manner as described above with respect to the cover and base layers 222, 224 (FIG. 3). For example, the cover and base layers 322, 324A, 324B may be coupled to each other during a lamination process. The cover and base layers 322, 324A, 324B may be stacked and aligned with respect to each other so that each of the base extensions 352A of the base layer 324A is aligned with a corresponding base extension 352B of the base layer 324B. Prior to stacking, B-stage or prepreg sheets (not shown) may be positioned so that one sheet is located along an interface between the cover layer 322 and the base layer 324A and another sheet is located along an interface between the base layers 324A, 324B. The sheets are subjected to heat and pressure to cure the sheets and couple (e.g., bond) the base layers 324A, 324B to each other and the cover layer 322 to the base layer 324A. At this time, the aligned base extensions 352A, 352B from the base layers 324A, 324B may be bonded to each other.

Figure 9:
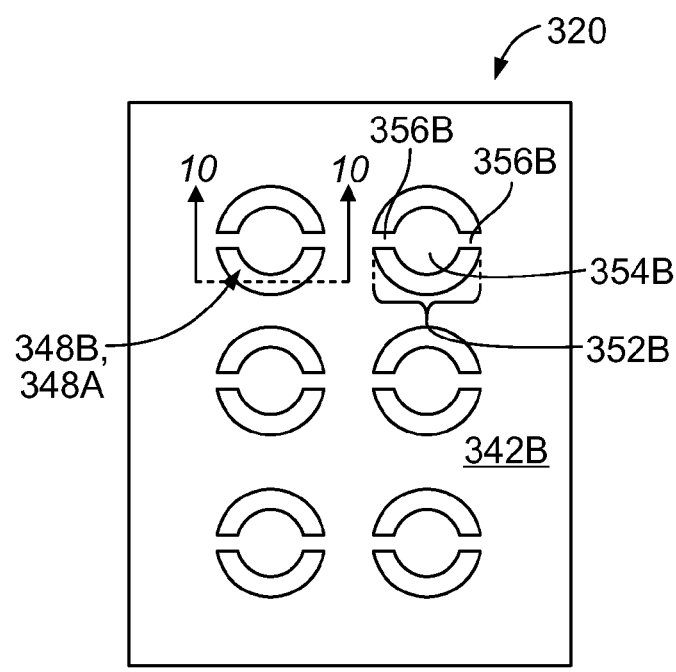
FIG. 9 shows a top plan view of the board substrate of FIG. 8.
Figure 10:
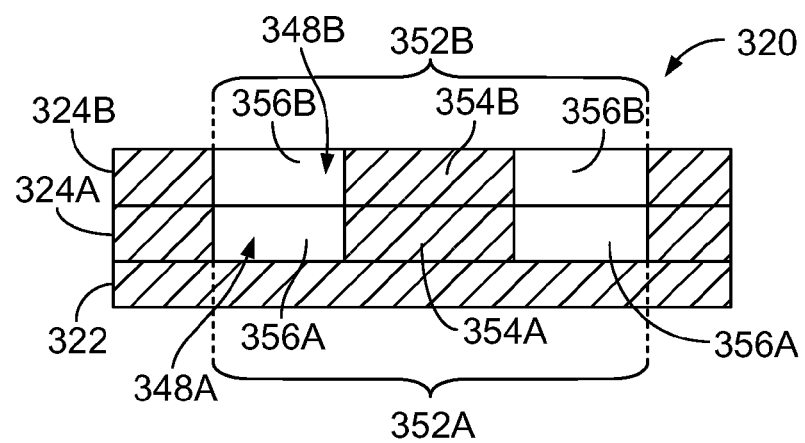
FIG. 10 is an enlarged cross-section of the board substrate of FIG. 8 before a substrate removal process.

FIGS. 9 and 10 include a plan view and a cross-section of the board substrate 320, respectively, before a material removal operation. FIGS. 9 and 10 are inverted with respect to FIG. 8 such that FIG. 9 is a plan view of the layer side 342B and FIG. 10 has the cover layer 322 at the bottom of the drawing. With respect to FIG. 10, the base extensions 352A, 352B from the base layers 324A, 324B are stacked and coupled to each other. In an exemplary embodiment, the base extension 352A includes a dielectric member 354A that is coupled to the remainder of the base layer 324A through one or more joints 356A. Likewise, the base extension 352B includes a dielectric member 354B that is coupled to the remainder of the base layer 324B through one or more joints 356B. For illustrative purposes, the dielectric member 354B and the joints 356B are also shown for one base extension 352B in FIG. 9.

With respect to FIG. 10, after the cover and base layers 322, 324A, 324B are coupled to one another, the joints 356A, 356B may be removed through a material removal operation. As one particular example, a drill bit may be inserted into two aligned material holes 348 as shown in FIG. 10 and routed around a path to remove the joints 356A, 356B. In this case, a total of four joints 356A, 356B are removed because two joints are removed from each of the base layers 324A, 324B.

Figure 11:
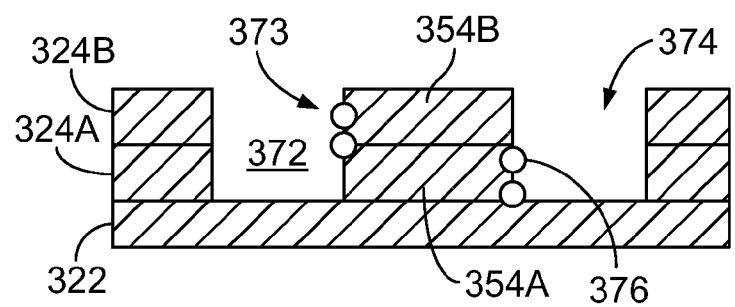
FIG. 11 is an enlarged cross-section of the board substrate of FIG. 8 after a substrate removal process.

FIG. 11 shows the same view as FIG. 10, but after the joints 356A, 356B (FIG. 10) have been removed. With respect to FIG. 11, a core-holding channel 372 exists around the stacked dielectric members 354A, 354B. When the dielectric members 354A, 354B are stacked and coupled as shown in FIG. 11, the dielectric members 354A, 354B may be considered a single dielectric member 373 that is surrounded by the core-holding channel 372. The core-holding channel 372 may be similar to the core-holding channel 272 (FIG. 5) and extend circumferentially around the dielectric member 373. After the removal of the joints 356A, 356B, the material holes 348, 350 (FIG. 8) become a single material hole 374.

The material hole 374 may be improperly dimensioned or may have other undesirable material therein, such as particles 376. The particles 376 may be formed from resin that flowed into the material hole 374 during lamination. The particles 376 may also be a result of the manufacturing process that produced the material holes 348, 350 (FIG. 8). To remove the particles 376, surfaces that define the core-holding channel 372 may be further etched or drilled to suitably shape the core-holding channel 372 and material hole 374 or to remove any unwanted material. In alternative embodiments, the particles 376 are removed when the joints 356A and 356B are removed (i.e., during the same substrate removal process).

FIGS. 8-11 illustrate one embodiment in which two base layers 324A, 324B are stacked and coupled to each other. However, in other embodiments, only one base layer may be used or, alternatively, more than two base layers may be stacked with respect to each other. Moreover, in other embodiments, each of the base extensions may include only one joint. The base layers may be configured similarly so that the joints are stacked with respect to each other. Alternatively, the joints may have different locations so that the joints are not stacked directly over one another. In such embodiments, the drill bit may only be required to remove one joint at a time instead of, for example, two stacked joints at one time.

Figure 12:
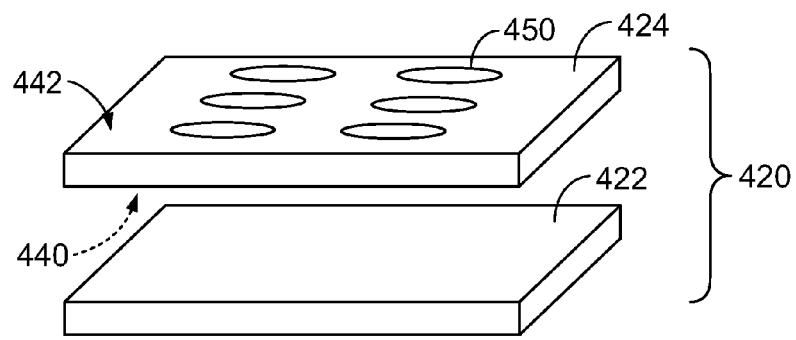
FIG. 12 is an exploded view of a planar board substrate formed in accordance with one embodiment.

FIG. 12 is an exploded view of a planar board substrate 420 formed in accordance with one embodiment. The board substrate 420 includes a cover layer 422 and a base layer 424. The base layer 424 has opposite first and second layer sides 440, 442 and includes material holes 450 that extend therethrough. The material holes 450 may be formed as described above with respect to the material holes 150 (FIG. 3) and 348, 350 (FIG. 8). In the illustrated embodiment, the cover layer 422 is a continuous sheet of material without holes. The cover and base layers 422, 424 may be formed from substrate materials, such as the substrate materials described above with respect to the cover layer 222 (FIG. 3) and the base layer 224 (FIG. 3). The cover and base layers 422, 424 may be coupled together in a laminating process as described above. The substrate material may include or be formed from a dielectric material, such as a glass-filled epoxy (e.g., FR-4) suitable for a printed circuit board (PCB), a thermoset material, or a thermoplastic material. The substrate materials can be alternating layers of fully cured substrates and uncured B Stage material unless the materials are thermoplastic or fluid stage thermoset. A thickness dimension of the base layers can be made up of one thick layer or several sheets of prepreg or alternating layers with similar patterns. Other rigid or semi-rigid materials may be used.

Figure 13:
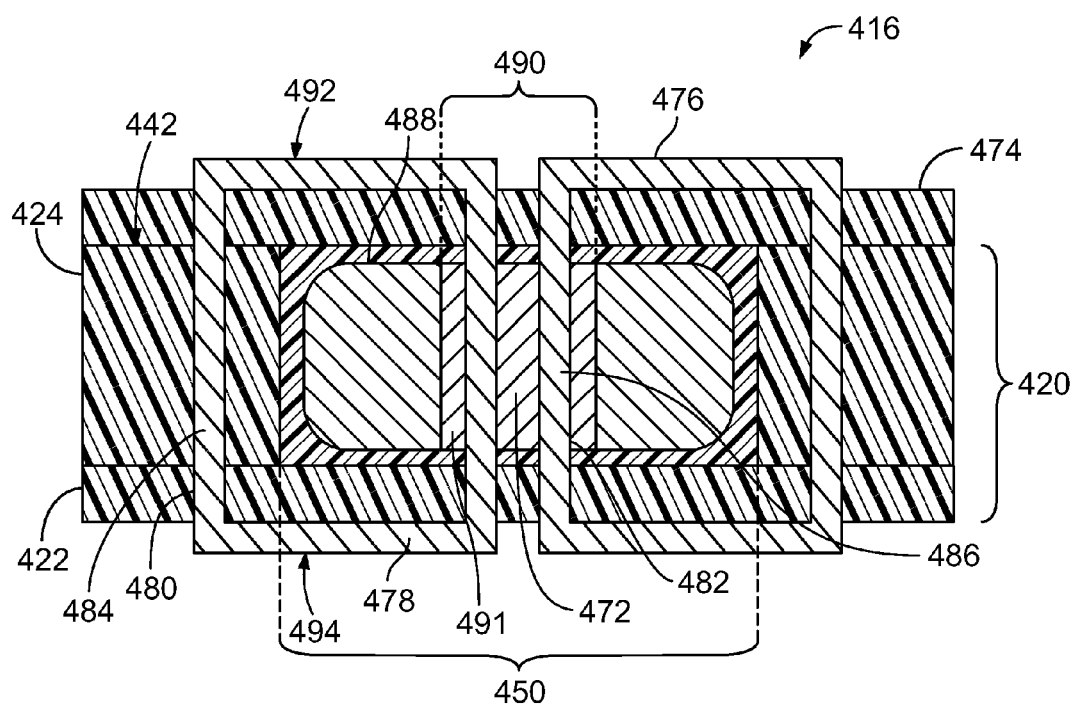
FIG. 13 is a cross-section of a planar electronic device formed in accordance with one embodiment that includes the board substrate of FIG. 12.

FIG. 13 shows a cross-section of a portion of a planar electronic device 416 that includes the board substrate 420. After the board substrate 420 is formed, a magnetic core 488 may be disposed in the material hole 450. The magnetic core 488 may have a circular or oval-like shape that surrounds a core void 490. The magnetic core 488 is inserted into the material hole 450 through the second side 442. Although not shown, the base layer 424 and/or the cover layer 422 may include alignment features that are configured to hold the magnetic core 488 in a predetermined position in the material hole 450. The alignment features could be formed in a similar way as described above by drilling or etching the substrate material of the base layer 424 and/or the cover layer 422.

Once the magnetic core 488 is disposed in the material hole 450, an elastic and non-conductive encapsulating material 472 may be deposited into the material hole 450. The encapsulating material 472 flows into the core void 490 and envelopes the magnetic core 488. The encapsulating material 472 is allowed to cure such that the encapsulating material 472 is hardened and completely surrounds the magnetic core 488. Accordingly, a dielectric member 491 is formed in the core void 490.

As shown in FIG. 13, another substrate layer 474 may be laminated to the second side 442. Conductive layers 476, 478 may then be bonded to the substrate layer 474 and the cover layer 422, respectively, using an insulating adhesive. Thru-holes 480 may then be drilled through the top conductive layer 476, the substrate layer 474, the base layer 424, the cover layer 422, and the bottom conductive layer 478. Thru-holes 482 may then be drilled through the top conductive layer 476, the substrate layer 474, the dielectric member 491, the cover layer 422, and the bottom conductive layer 478. The thru-holes 480, 482 may then be cleaned and plated with a conductive material to provide conductive vias 484, 486. The conductive layer 476, 478 may then be etched to provide top conductors 492 along the substrate layer 474 and bottom conductors 494 along the cover layer 422.

Although not shown, additional modifications and/or features may be added to the planar electronic device 416. For example, the electronic device 416, as it is shown in FIG. 13, may then be coated with an insulating material.

Figure 14:
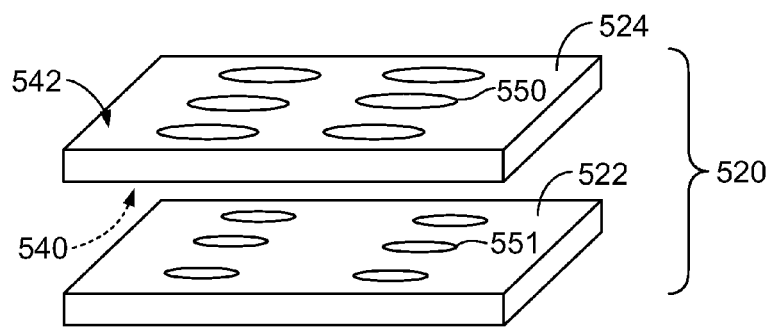
FIG. 14 is an exploded view of a planar board substrate formed in accordance with one embodiment.

FIG. 14 is an exploded view of a planar board substrate 520 formed in accordance with one embodiment. The board substrate 520 includes a cover layer 522 and a base layer 524. The base layer 524 has opposite first and second sides 540, 542 and includes a plurality of material holes 550 that extend completely therethrough. The cover and base layers 522, 524 may be similar or identical to the cover and base layers 422, 424 of FIG. 13. However, the cover layer 522 may have cover holes 551 that extend completely through the cover layer 522. The cover holes 551 are similar in shape and location as the material holes 550 of the base layer 524. More specifically, the cover holes 551 are sized and shaped to have smaller dimensions than the material holes 550. The cover and base layers 522, 524 may be coupled to each other through a laminating process as described above.

Figure 15:
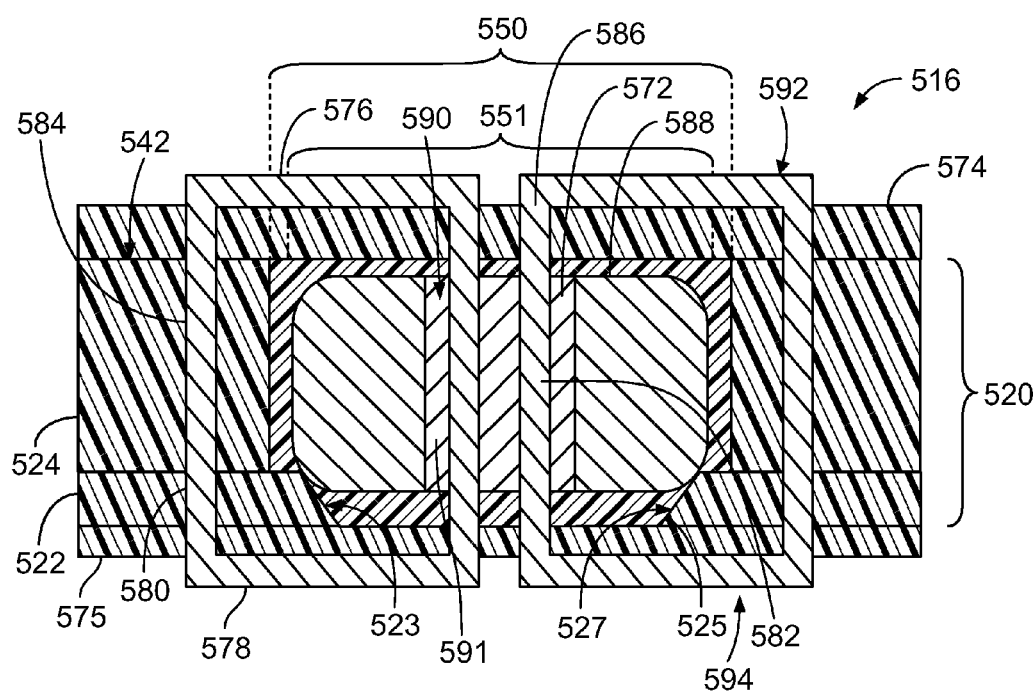
FIG. 15 is a cross-section of a planar electronic device formed in accordance with one embodiment that includes the board substrate of FIG. 14.

FIG. 15 shows a cross-section of a portion of a planar electronic device 516 that includes the board substrate 520. As shown, the cover layer 522 may include an alignment feature 523. For example, the alignment feature 523 may be an edge 525 that defines the cover hole 551. In particular embodiments, the edge 525 is formed to have a sloped surface 527. The edge 525 may be formed through drilling and/or etching. Dimensions of the edge 525 are configured to hold a magnetic core 588 in a predetermined position.

A substrate layer 575 comprising a continuous sheet of substrate material may be coupled to the cover layer 522 during a laminating process thereby covering the cover hole 551. The magnetic core 588 may be inserted through the second side 542 into the material hole 550 and positioned on the sloped surface 527. The magnetic core 588 may have a circular or oval-like shape that surrounds a core void 590.

With the magnetic core 588 disposed in the material hole 550, an elastic and non-conductive encapsulating material 572 may be deposited into the material hole 550. The encapsulating material 572 flows into the core void 590 and envelopes the magnetic core 588. When the encapsulating material 572 cures, a dielectric member 591 is formed in the core void 590.

As shown in FIG. 15, another substrate layer 574 may be laminated to the second side 542. Conductive layers 576, 578 may then be bonded to the substrate layer 574 and the substrate layer 575, respectively, using an insulating adhesive. Thru-holes 580 may then be drilled through the top conductive layer 576, the substrate layer 574, the base layer 524, the cover layer 522, the substrate layer 575, and the bottom conductive layer 578. Thru-holes 582 may then be drilled through the top conductive layer 576, the substrate layer 574, the dielectric member 591, the substrate layer 575, and the bottom conductive layer 578. The thru-holes 580, 582 may then be cleaned and plated with a conductive material to provide conductive vias 584, 586. The conductive layer 576, 578 may then be etched to provide top conductors 592 along the substrate layer 574 and bottom conductors 594 along the substrate layer 575.

FIGS. 14 and 15 illustrate an embodiment in which the cover layer 522 has cover holes 551 before the cover layer 522 and the base layer 524 are laminated together. In other embodiments, the cover layer 522 may not have the cover holes 551 before lamination. Instead, the cover layer 522 and the base layer 524 may be laminated together to form a structure that is similar to the board substrate 420 (FIG. 12). Once coupled together, cover holes similar to the cover holes 551 may be formed in a substrate removal operation such as those described above (e.g., punching, drilling, or etching). In some embodiment, the sloped surface 527 may be formed during the substrate removal process. The board substrate 520 may then be processed in a similar manner as described above with respect to FIGS. 14 and 15.

Figure 16:
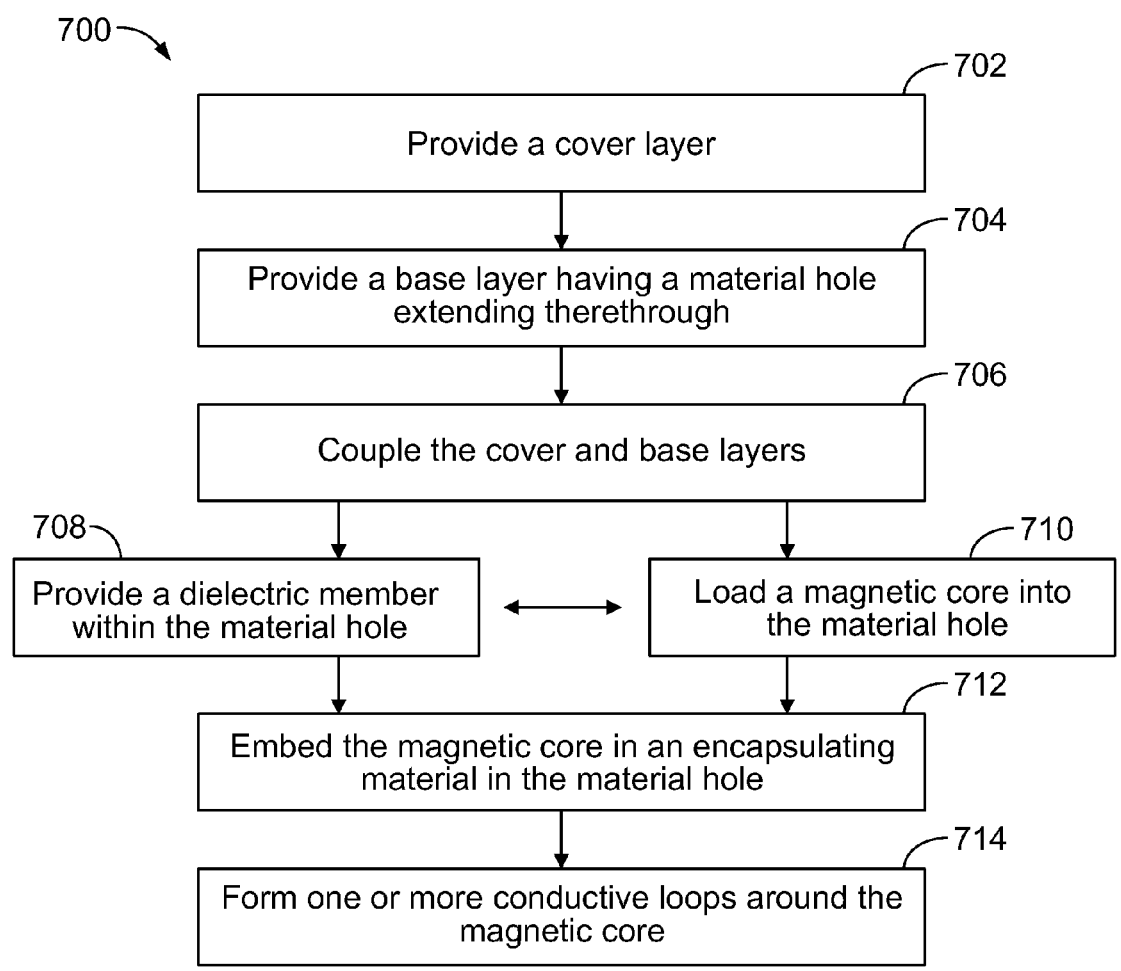
FIG. 16 is a flowchart illustrating a method of manufacturing a planar board substrate in accordance with various embodiments.

FIG. 16 is a flowchart illustrating a method 700 of manufacturing a planar electronic device, such as the planar electronic devices 116 (FIG. 1), 416 (FIG. 13), and 516 (FIG. 15). The initial operations of the method 700 may include manufacturing a planar board substrate. The planar board substrate may be similar to, for example, the board substrate 104 (FIG. 1) or the board substrates 220 (FIG. 3), 320 (FIG. 8), 420 (FIG. 12), and 520 (FIG. 14). The method may exist in various embodiments, such as those described above with respect to FIGS. 3-15. Although the flowchart includes arrows that indicate an order of the operations in the method 700, the method 700 is not required to be performed as shown as some operations may occur before, after, or simultaneously with others.

The method 700 includes providing at 702 a cover layer and providing at 704 a base layer having at least one material hole that extends completely therethrough. The providing operation 704 may include supplying a base layer in which the material hole was previously formed or, alternatively, the method 700 may include supplying a base layer and then forming the material hole. Various substrate material removal operations exist that may form the material hole, such as the punching, drilling (or routing), or etching operations described above. In some embodiments, the cover layer may also have cover holes extending completely therethrough, such as the cover layer 522 (FIG. 14). The cover hole may be previously formed or the method 700 may include forming the cover hole.

The method 700 also includes coupling at 706 the cover layer and the base layer to each other. For example, the base layer may have first and second sides and the cover layer may have a layer side. The base and cover layers may be coupled to each other along the first side and the layer side. The cover layer may at least partially cover the material hole. In some embodiments, the cover layer may completely cover the material hole.

The method 700 also includes providing at 708 a dielectric member within the material hole and loading at 710 a magnetic core into the material hole. The loading at 710 may occur after or before the providing at 708. For example, FIGS. 3-15 illustrate various manners in which the dielectric member may be provided at 708. For example, with respect to FIGS. 3-7, the dielectric member 226 may be provided when the cover layer 222 and the base layer 224 are coupled to each other at 706. The core-holding channel 272 may also be formed at this time and subsequently modified with an optional substrate material removal operation. With respect to FIGS. 8-11, the dielectric member 373 may be provided when the joints 356A, 356B are removed from the material hole 374. With the joints 356A, 356B removed, the core-holding channel 372 exists between the dielectric member 373 and the base layers 324A, 324B.

With respect to FIGS. 12-13, the dielectric member 491 may be provided after the loading at 710 of the magnetic core. More specifically, an elastic and non-conductive encapsulating material 472 may be deposited into the material hole 450 having the magnetic core 488. The encapsulating material 472 may flow into the core void 490 of the magnetic core 488. When the encapsulating material 472 cures, the dielectric member 491 is provided. As in the above examples, a core-holding channel may exist between the base layer 424 and the dielectric member 491. The core-holding channel extends circumferentially around the dielectric member 491.

The method 700 may also include embedding at 712 the magnetic core in an encapsulating material in the material hole. With respect to the embodiment of FIGS. 3-7, the magnetic core 288 may be provided after the dielectric member 226 is formed and then embedded by depositing an elastic and non-conductive encapsulating material. Likewise, a magnetic core similar to the magnetic core 288 (FIG. 7) may be provided to the core-holding channel 372 in FIG. 11 after the dielectric member 373 is formed and then embedded by depositing an elastic and non-conductive encapsulating material. With respect to the embodiments of FIGS. 12-15, the magnetic core is embedded simultaneously with the dielectric member being provided. The method 700 may also include forming at 714 one or more conductive loops around the magnetic core as described above.

Figure 17:
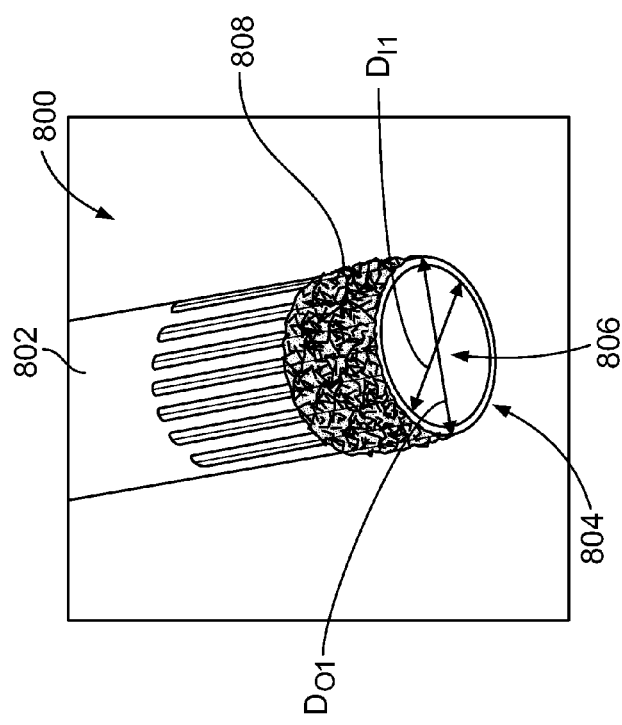
FIG. 17 is a perspective view of a hollow drill bit that may be used during the manufacture of a planar board substrate.
Figure 18:
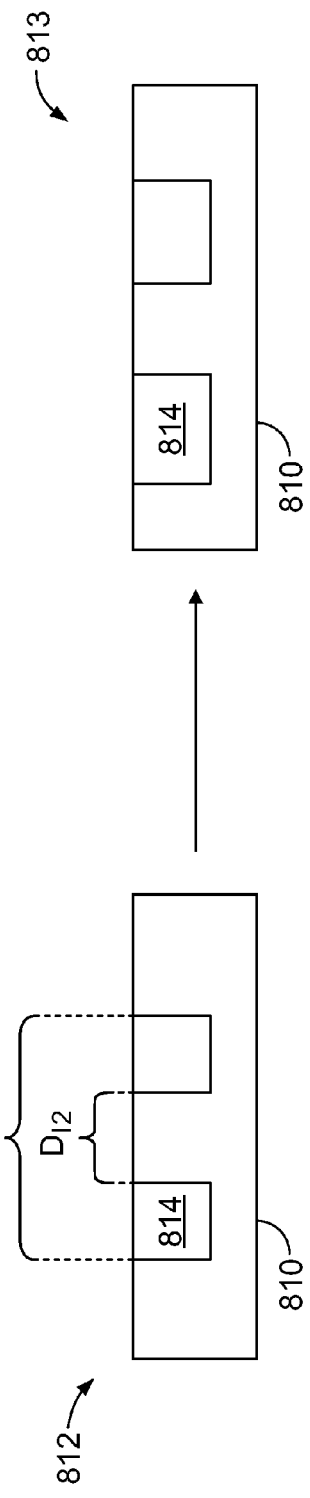
FIG. 18 shows the planar board substrate at different stages of manufacture using the hollow drill bit.

FIGS. 17 and 18 illustrate alternative methods of manufacturing a planar electronic device and, more specifically, alternative methods of providing material holes and/or core-holding channels in substrates. In the embodiments of FIGS. 3-16, the material holes and core-holding channels are formed by stacking substrate layers in which at least one of the substrate layers already includes a hole. However, the embodiments of FIGS. 17 and 18 may include directly removing substrate material from an already laminated planar board substrate. After the material hole is made, a planar electronic device may then be formed as described above.

FIG. 17 is a perspective view of a hollow drill bit 800. As shown, the hollow drill bit 800 includes a shaft 802 having a bit end 804. The bit end 804 includes a shaft cavity 806 that extends a depth (not shown) into the shaft 802. The shaft 802 includes a drill wall 808 that defines the shaft cavity 806. An interior surface of the drill wall 808 defines an inner diameter $D_{I1}$ and an exterior surface of the drill wall 808 defines an outer diameter $D_{O1}$. The interior and exterior surfaces at the bit end 804 may be roughened to facilitate drilling the board substrate.

FIG. 18 shows a board substrate 810 at different stages of manufacture. At stage 812, the board substrate 810 has been drilled using the drill bit 800 (FIG. 17). In some embodiments, water or coolant may be used to cool and lubricate the bit end 804 (FIG. 17). When the board substrate 810 includes epoxy fiberglass, the drill bit 800 may be a diamond drill bit. After the board substrate 810 is drilled, a core-holding channel 814 is formed. The core-holding channel 814 has an outer diameter $D_{O2}$ that is substantially equal to the outer diameter $D_{O1}$ of the drill bit 800 and has an inner diameter $D_{I2}$ that is substantially equal to the inner diameter $D_{I1}$. The drill bit 800 may remove anywhere for 80%-100% of the substrate material that is required to be removed to form the desired core-holding channel 814. However, if the drill bit 800 does not remove 100% of the substrate material that is required to be removed to form the desired core-holding channel 814, the board substrate 810 may be subsequently drilled using a conventional drill bit (i.e., not a hollow drill bit) at stage 813. Dimensions of the core-holding channel 814 may be effectively increased due to the optional drilling.

Figure 19:
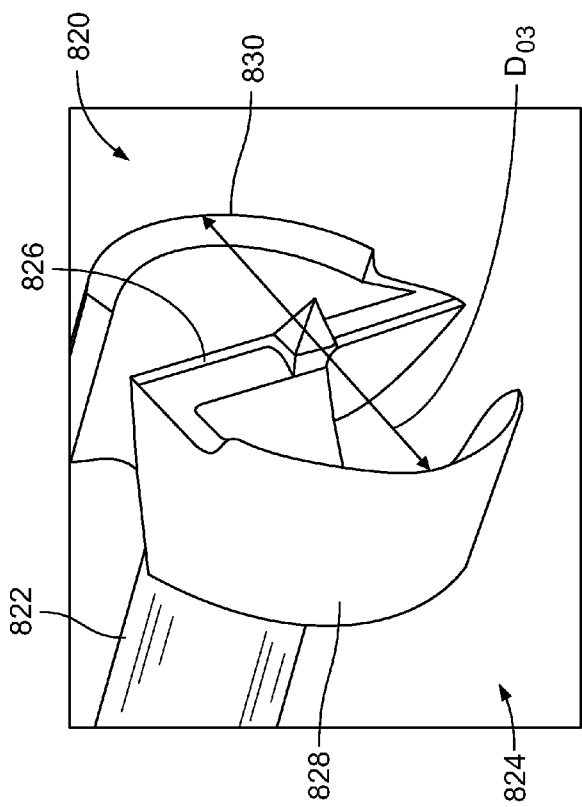
FIG. 19 is a perspective view of a Forstner drill bit that may be used during the manufacture of a planar board substrate.

FIG. 19 is a perspective view of a Forstner drill bit 820. As shown, the Forstner drill bit 820 includes a shaft 822 and a bit end 824 that is coupled to the shaft 822. The bit end 824 includes a main edge 826 and a pair of arcuate rims 828, 830 that extend in a circumferential manner from opposite ends of the main edge 826. Exterior surfaces of the arcuate rims 828, 830 define an outer diameter $D_{O3}$ of the bit end 824.

Figure 20:
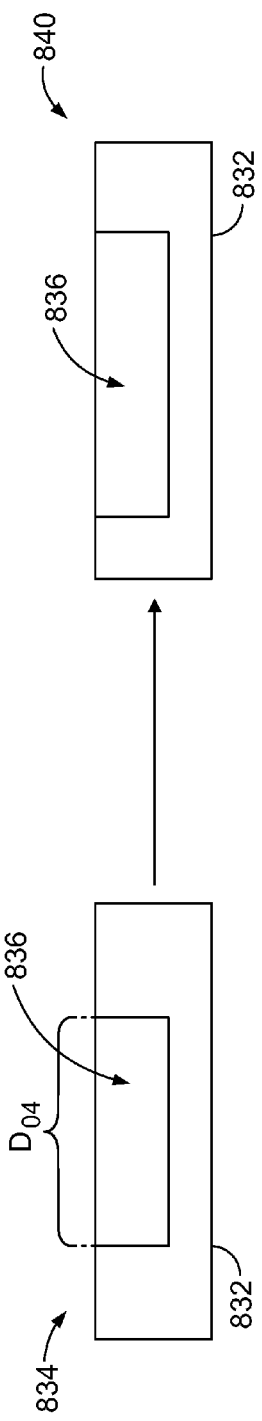
FIG. 20 shows the planar board substrate at different stages of manufacture using the Forstner drill bit.

FIG. 20 shows a board substrate 832 at different stages of manufacture. At stage 834, the board substrate 832 has been drilled using the drill bit 820 (FIG. 19). After the board substrate 832 is drilled, a material hole 836 is formed. The material hole 836 has an outer diameter $D_{O4}$ that is substantially equal to the outer diameter $D_{O3}$ of the drill bit 820. The drill bit 820 may remove anywhere for 80%-100% of the substrate material that is required to be removed to form the desired material hole 836. However, if the drill bit 820 does not remove 100% of the substrate material that is required to be removed to form the desired material hole 836, the board substrate 832 may be subsequently drilled using a conventional drill bit at stage 840. Dimensions of the material hole 836 may be increased due to the subsequent drilling.

After the core-holding channel 814 (FIG. 18) is formed, a magnetic core may be loaded into the core-holding channel 814 and a planar electronic device may be manufactured in a similar manner as described above. After the material hole 836 (FIG. 20) is formed, a magnetic core may be loaded into the material hole 836 and a planar electronic device may be manufactured in a similar manner as described above. In some embodiments, the material removal process that was used may be identified upon inspection of the interior surfaces that define the core-holding channel 814 or the material hole 836. As such, the surfaces may characterized as hollow-drilled surfaces or Forstner-drilled surfaces.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A planar electronic device comprising:
a cover layer of substrate material;
a base layer of substrate material coupled to and extending alongside the cover layer, the base layer including a material hole that extends completely through the base layer, the cover layer extending over at least a portion of the material hole;
a magnetic core positioned in the material hole;
a dielectric member within the material hole, wherein a core-holding channel exists between the dielectric member and the base layer, the core-holding channel extending circumferentially around the dielectric member and having the magnetic core therein, wherein the core-holding channel is partially defined by an alignment feature that engages only a portion of an exterior of the magnetic core, the alignment feature being shaped from a portion of the base layer; and
a plurality of conductive loops that extend around the magnetic core and the alignment feature.

2. The planar electronic device of claim 1, wherein the material hole is defined by an inwardly-facing surface in which at least a portion of the inwardly-facing surface is a sheared surface.

3. The planar electronic device of claim 1, further comprising a substrate layer coupled to the base layer, the base layer being located between the cover layer and the substrate layer.

4. The planar electronic device of claim 1, wherein the core-holding channel is defined by an inwardly-facing surface of the base layer and an outwardly-facing surface of the dielectric member that faces the inwardly-facing surface, the alignment feature extending from one of the inwardly-facing surface or the outwardly-facing surface toward the magnetic core.

5. The planar electronic device of claim 4, wherein the alignment feature extends between and couples to a surface of the cover layer that defines a bottom of the core-holding channel and said one of the inwardly-facing surface or the outwardly-facing surface.

6. The planar electronic device of claim 4, wherein the alignment feature has a sloped surface relative to said one of the inwardly-facing surface or the outwardly-facing surface.

7. The planar electronic device of claim 1, wherein a material of the dielectric member is identical to the substrate material of the base layer and the dielectric member and the base layer have identical thicknesses.

8. A planar electronic device comprising:
a cover layer of substrate material;
a base layer of substrate material coupled to and extending alongside the cover layer, the base layer including a material hole that extends completely through the base layer, the cover layer extending over at least a portion of the material hole;
a magnetic core positioned in the material hole;
a dielectric member within the material hole, wherein a core-holding channel exists between the dielectric member and the base layer, the core-holding channel extending circumferentially around the dielectric member and having the magnetic core therein, wherein the core-holding channel is partially defined by an alignment feature that engages only a portion of an exterior of the magnetic core, the alignment feature being shaped from a portion of the cover layer; and
a plurality of conductive loops that extend around the magnetic core.

9. The planar electronic device of claim 8, wherein the alignment feature is formed from an edge of the cover layer that defines a cover hole through the cover layer, the cover hole being aligned with the material hole.

10. The planar electronic device of claim 9, further comprising a substrate layer that extends along the cover layer and covers the cover hole.

11. The planar electronic device of claim 8, further comprising an encapsulating material disposed within the material hole, the encapsulating material surrounding the magnetic core and forming the dielectric member.

12. The planar electronic device of claim 11, wherein the plurality of conductive loops extend through the dielectric member and the base layer.

13. The planar electronic device of claim 8, wherein the material hole is defined by an inwardly-facing surface in which at least a portion of the inwardly-facing surface is a sheared surface.

* * * * *